United States Patent
Spruck

[11] Patent Number: 5,978,143
[45] Date of Patent: Nov. 2, 1999

[54] STEREOSCOPIC RECORDING AND DISPLAY SYSTEM

[75] Inventor: Bernd Spruck, Mögglingen, Germany

[73] Assignee: Carl-Zeiss-Stiftung, Heidenheim, Germany

[21] Appl. No.: 09/154,773

[22] Filed: Sep. 17, 1998

[30] Foreign Application Priority Data

Sep. 19, 1997 [DE] Germany .................. 197 41 274

[51] Int. Cl.⁶ .................. G02B 27/10; G02B 27/22; H04N 13/02
[52] U.S. Cl. .................. 359/619; 359/467; 348/47
[58] Field of Search .................. 359/619, 630, 359/458, 467, 468, 470; 348/51, 47, 48

[56] References Cited

U.S. PATENT DOCUMENTS

| | | | |
|---|---|---|---|
| 3,705,261 | 12/1972 | Langley | 348/42 |
| 4,818,858 | 4/1989 | Sorimachi et al. | 250/201 |
| 5,457,574 | 10/1995 | Eichenlaub | 359/619 |
| 5,712,732 | 1/1998 | Street | 359/630 |

FOREIGN PATENT DOCUMENTS

| | | |
|---|---|---|
| 296 12 054 U | 9/1996 | Germany . |
| 01093727 | 4/1989 | Japan . |
| 01093984 | 4/1989 | Japan . |
| 2281170 | 2/1995 | United Kingdom . |

Primary Examiner—Hung Xuan Dang
Assistant Examiner—Ricky Mack
Attorney, Agent, or Firm—Walter Ottesen

[57] ABSTRACT

The invention relates to a stereoscopic recording and display system, preferably having an autostereoscopic display system, wherein the position of the observer (especially the distance of the observer from the display system) is determined with a head tracking system and the convergence angle between the two cameras of the recording system is changed in dependence upon the distance of the observer from the display system in such a manner that, for an approach of the observer toward the system, the optical axes of both cameras are greatly convergent and, for a distancing of the observer from the display, the optical axes of both cameras are only slightly convergent. Simultaneously, the cameras are always focussed onto the intercept point of the optical axes of both cameras. By changing the convergence angle in dependence upon the distance of the observer from the display screen, either close image contents or distant image contents of the recorded scene are displayed stereoscopically depending upon the particular distance of the observer.

9 Claims, 2 Drawing Sheets

FIG. 1

STEREOSCOPIC RECORDING AND DISPLAY SYSTEM

BACKGROUND OF THE INVENTION

DE 296 12 054 discloses an autostereoscopic display system having a display and a screen arranged at the viewing end of the display. The screen has a plurality of cylindrical lenses. The actual position of the viewer in front of the recording system is determined by a head tracker system and the screen is displaced relative to the display such that the viewer can discern a stereoscopic image from the instantaneous position. The movement of the screen takes place relative to the display in such a manner that the right eye of the observer views only the image gaps, which are assigned to the right sectional image, and the left eye of the viewer views only the image gaps of the display assigned to the left sectional image.

A similar autostereoscopic display system is known from U.S. Pat. No. 5,457,574 wherein the position of the viewer forward of the recording system is likewise determined by means of a head tracker. However, here, the position of the screen is not moved relative to the display in correspondence to the actual viewer position; instead, the light source rearward of the display is switched so that the viewer perceives an autostereoscopic image in his actual viewing position. Furthermore, in this patent, it is already suggested that the output signal of the head tracker be utilized simultaneously to also select the shown view in that, for example, two video cameras are moved in correspondence to the head movements of the viewer. With the video cameras, the stereoscopic partial views are recorded. More details with reference to the movement of the cameras in dependence upon the viewer position or the position of the head of the viewer are not presented in this patent.

A camera system for a robot is known from U.S. Pat. No. 4,818,858. The camera system includes two video cameras which execute mutually opposing rotational movements about the same angle relative to a base.

With the aid of a triangulation system, which is integrated into the cameras, the focussing of both cameras and the convergence of the optical axes of both cameras are simultaneously so controlled that the object to be viewed lies in the intersect point of the two optical axes of the two cameras and both cameras are simultaneously focussed onto this intersect point. The stereo image recorded by both cameras is presented to a viewer on a stereoscopic display system. The observer wears a helmet having sensors which detect the head movement of the observer and their output signals are utilized to control the robot with the stereoscopic camera system.

An important characteristic of the human stereoscopic vision is the coupling of the convergence angle of the two eyes in dependence upon the desired viewing distance. For a large viewing distance, the optical axes of both eyes are aligned almost parallel with the result that objects, which lie farther from the observer, can be viewed stereoscopically. For close viewing, the two eyeballs are rotated in opposite directions toward each other so that the optical axes of both eyes are very convergent with the result that the close lying objects can be perceived stereoscopically.

SUMMARY OF THE INVENTION

The object of the invention is a stereoscopic recording and display system wherein the stereoscopically shown image content is easily controllable by the observer within the scene, which is recorded by the stereo camera.

The stereoscopic recording and display system of the invention includes: a stereoscopic display arrangement; a support; two cameras arranged on the support so as to be rotatable in mutually opposite directions and the two cameras having respective mutually converging optical axes conjointly defining an intercept point which moves along a predetermined path as the cameras rotate; a focusing arrangement for focusing the cameras on the intercept point; a head tracking system for detecting the position of an observer forward of the stereoscopic display arrangement; and, a control for adjusting the convergence of the optical axes in dependence upon the distance of the observer from the stereoscopic display arrangement.

The stereoscopic recording and display system according to the invention includes an arrangement having two video cameras accommodated thereon. The two video cameras are rotatable in mutually opposite directions and are both focussed on the intersect point of the optical axes of both cameras. Furthermore, the recording and display system of the invention includes a stereoscopic display system and a head tracker system which detects the position of the observer forward of the stereoscopic display system. A control effects a rotation of the cameras in opposition to each other via a motor drive based on the position data supplied by the head tracker system. The rotation of the cameras in mutually opposite directions is in dependence upon the distance of the observer from the stereoscopic display system. This distance is determined with the head tracker. The rotation of the cameras in mutually opposite directions takes place in such a manner that a greater convergence is generated when the observer comes closer to the display system and a weaker convergence of the optical axes of both cameras is generated when the observer is at a distance from the display system. Simultaneously, the cameras are focussed on the intersect point of the two optical axes of the two cameras via a motor focus in dependence upon the distance of the observer from the stereoscopic display system.

For a larger distance of the observer from the stereoscopic display system, the image contents, which are more distant from the cameras, are stereoscopically displayed because of the slight convergence of the two optical axes of the cameras. If the observer approaches the display, which takes place for a desired detail view in most cases as a reflex, the convergence of the optical axes of the two cameras is increased whereby image contents lying in the vicinity of the camera are stereoscopically shown. The remote-lying image contents are presented unsharp simultaneously because of the simultaneous focussing on the intercept point of the optical axes which now lies closer to the cameras. This is completely equivalent to the human physiology of sight.

The stereoscopic display system is preferably configured as an autostereoscopic display system having a display and a screen forward of the display at the observer side. A head tracking system is, as a rule, anyway present for such a stereoscopic display in order to adapt the conditions for an autostereoscopic viewing to the actual observer position. The information as to the actual observer distance is anyway present for such an autostereoscopic system so that the same information supplied by the head tracker can be used a multiple number of times. The information is required for the convergence angle adjustment.

The adjustment of different convergence angles, that is, the rotation of the cameras in mutually opposite directions can be realized in different ways. For example, a camera arrangement corresponding to U.S. Pat. No. 4,818,858 can be used wherein both cameras are rotated in mutually opposite directions by the same angular amount via two mutually meshing gear wheels. In this case, the arrangement carrying both cameras can be fixed in space as a unit.

Alternatively, it is conceivable that only one of the two cameras is rotatable relative to the arrangement supporting the cameras and that both cameras can be rotated simultaneously with the arrangement supporting the cameras. In this case, the arrangement carrying the cameras executes a rotation, which corresponds to the change of the convergence angle, in the one direction and the camera, which is rotatably mounted on the arrangement, executes a mutually opposing rotation by twice the angle.

Especially advantageous is, however, an arrangement wherein the two cameras are rotatable on the arrangement carrying the cameras and, simultaneously, the entire arrangement with both cameras is itself rotatable about an axis perpendicular to the plane of the optical axes of the two cameras. In such a camera arrangement, the distance signal of the observer from the display system is, in turn, utilized for the adjustment of the convergence angle in that both cameras are rotated mutually oppositely by the same angle amounts relative to the arrangement supporting the cameras. This distance signal is supplied by the head tracker. In addition, the signal with respect to the horizontal position of the observer, which is also supplied from the head tracker system, is likewise utilized for the control of a rotational movement of the entire arrangement supporting the cameras. With a horizontal movement of the observer, the viewing direction of the cameras also changes as a consequence thereof so that image data are shown to the observer which are dependent upon the horizontal position forward of the display system. It is even more advantageous when the head tracker not only detects the position of the observer but simultaneously also detects a rotational movement of the head of the observer. In this case, the rotation of the arrangement supporting the cameras takes place in dependence upon a head rotation detected by the head tracker.

In all embodiments of the invention, the rotation of the two cameras relative to each other always takes place in that the intercept point of the optical axes of both cameras lies on the center line between the axes about which the cameras are rotatable.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
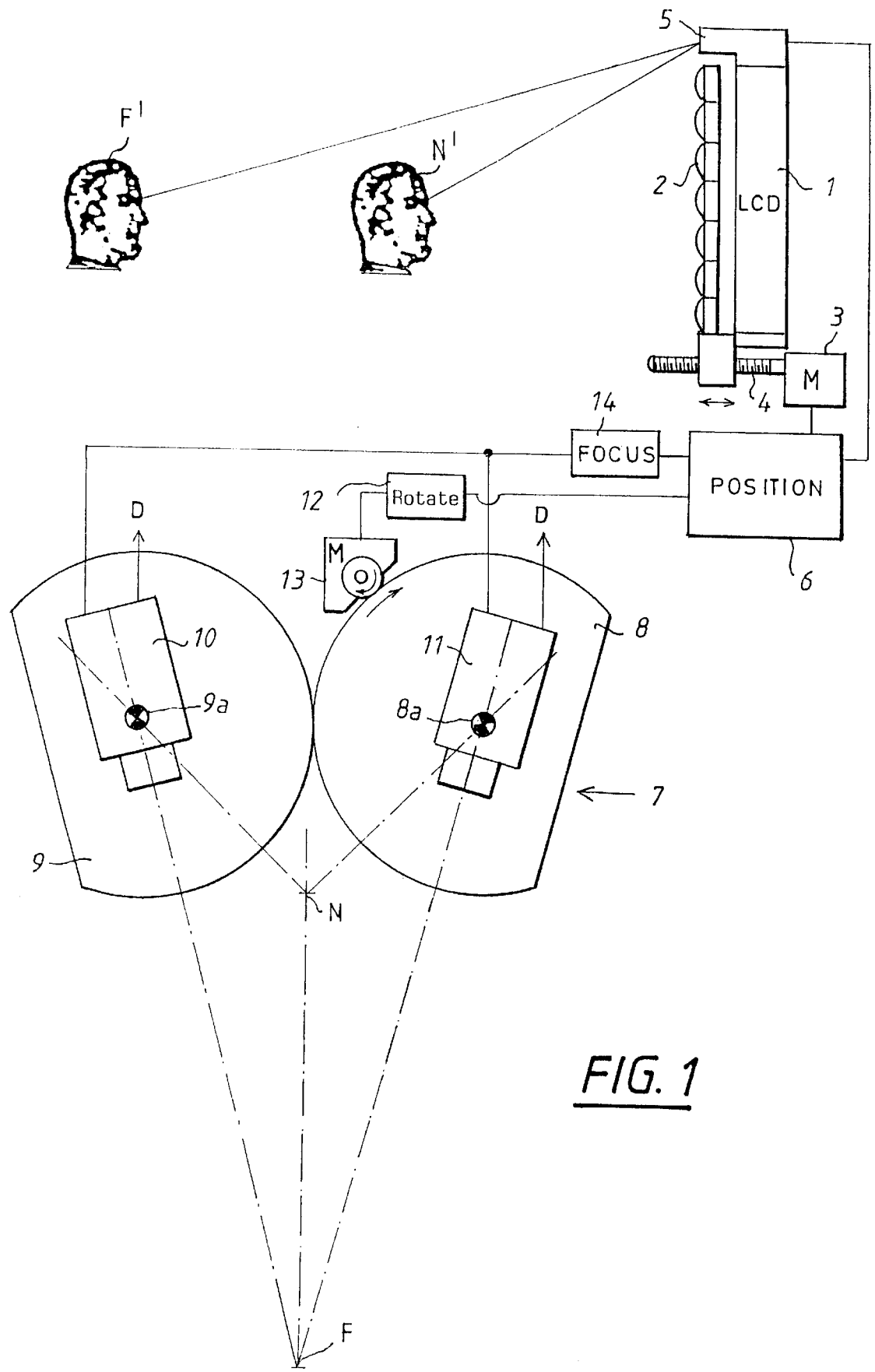
FIG. 1 is a schematic of a first embodiment for a stereoscopic recording and display system according to the invention; and, FIG. 2 is a schematic of an alternate embodiment for a recording and display system according to the invention.

The display system in FIG. 1 is an autostereoscopic display system as it is known from DE 296 12 054. The display system includes an LCD display 1 having a screen 2 positioned forward at the observer side. The screen 2 includes a plurality of vertically arranged cylinder lenses which have a spacing in the horizontal direction adapted to the gap spacing of the LCD display 1 so that an autostereoscopic viewing is possible in the viewing room. The screen 2 is arranged so as to be motorically moveable relative to the LCD display 1 perpendicularly to the plane of the screen 2 as well as in horizontal direction (perpendicular to the plane of the drawing in FIG. 1). In FIG. 1, for the sake of clarity, only the drive is shown for the movement perpendicular to the screen by means of an electric motor 3 and a threaded spindle 4.

The head tracker 5 is mounted above the autostereoscopic display system. This head tracker 5 is, in principle, an electro-optical positioning measurement system which determines the three-dimensional spatial coordinates of an observer positioned forward of the display system. Appropriate head trackers are offered, for example, by the Origin Instruments Company of the United States under the designation "Dyna Sight Sensor".

The spatial coordinates of the observer determined by the head tracker 5 are supplied to a control unit 6 such as a personal computer. Based on the spatial coordinates of the observer, the screen 2 is moved via a corresponding drive of the motor 3 so that the observer perceives an autostereoscopic image of his actual observer position. The corresponding functional interrelationships are, for example, described in DE 296 12 054 to which reference is made.

The stereoscopic recording system 7 includes an arrangement of two mutually meshing gear wheel discs (8, 9) on which respective video cameras (10, 11) are mounted with conventional motoric focussing. The cameras (10, 11) are mounted on the respective gear wheel discs (8, 9) so that the respective rotational axes (8a, 9a) of the gear wheel discs lie in the plane of the sensor of the respective cameras (10, 11). Each of the two cameras (10, 11) records a stereoscopic sectional image from which the autostereoscopic image, offered by the display system, is assembled. The feedback of the camera outputs to the display system is indicated in FIG. 1 by the arrows marked D (for the sake of clarity).

In the recording and display system of the invention, the output signals of the head tracker 5 are, in addition to controlling movements of the screen 2, simultaneously utilized for adjusting the convergence angle between the optical axes of the two cameras (10, 11). For this purpose, an electric motor 13 is provided which drives a gear wheel meshing with one of the two gear discs (8, 9). This electric motor 13 is driven via a rotation control circuit 12 in correspondence to the spacing of the observer from the display system. The basic control is such that the convergence angle of the optical axes of both cameras becomes greater when the observer approaches the display system. If the observer is located in the position F' farther remote from the display system, the optical axes (indicated by dot-dash) of both cameras (10, 11) are inclined toward each other so that they intersect at a point F remote from the recording system 7. When approaching the display system, a mutually opposing rotational movement of both cameras (10, 11) takes place via the motor 13 so that the intersect point of the two optical axes of both cameras moves closer to the cameras. The intersect point of both optical axes of the cameras (10, 11) then wanders along a line, which is likewise shown and which lies in the center plane parallel to the two rotational axes of the gear wheel discs (8, 9) and in the plane of the optical axes of the two cameras (10, 11). The focussing of the two cameras (10, 11) also simultaneously changes with the change of the convergence angle so that both cameras (10, 11) are always focussed on the intersect point of the optical axes. For this purpose, the distance data of the observer is supplied via a focussing control 14 to the focussing inputs of the cameras (10, 11). If the observer is at a close point N' relative to the display system, then both cameras are focussed on a close point N on the center line.

The gear ratio between a change of the observer distance from the display system and the convergence angle change of the two cameras (10, 11) resulting therefrom is freely selectable in order to take into account the different applications of the system. Especially when the system is utilized in connection with remotely controlled operations, that is, the observer, simultaneously with the viewing, undertakes a remote controlled manipulation via an input terminal within the viewing space recorded by the cameras (10, 11), a greatly overproportional gear ratio factor is preferred so that already slight distance changes of the observer (for example, a slight bending of the head) cause a change of the convergence of the optical axes of both cameras from a far point to a near point.

Figure 2:
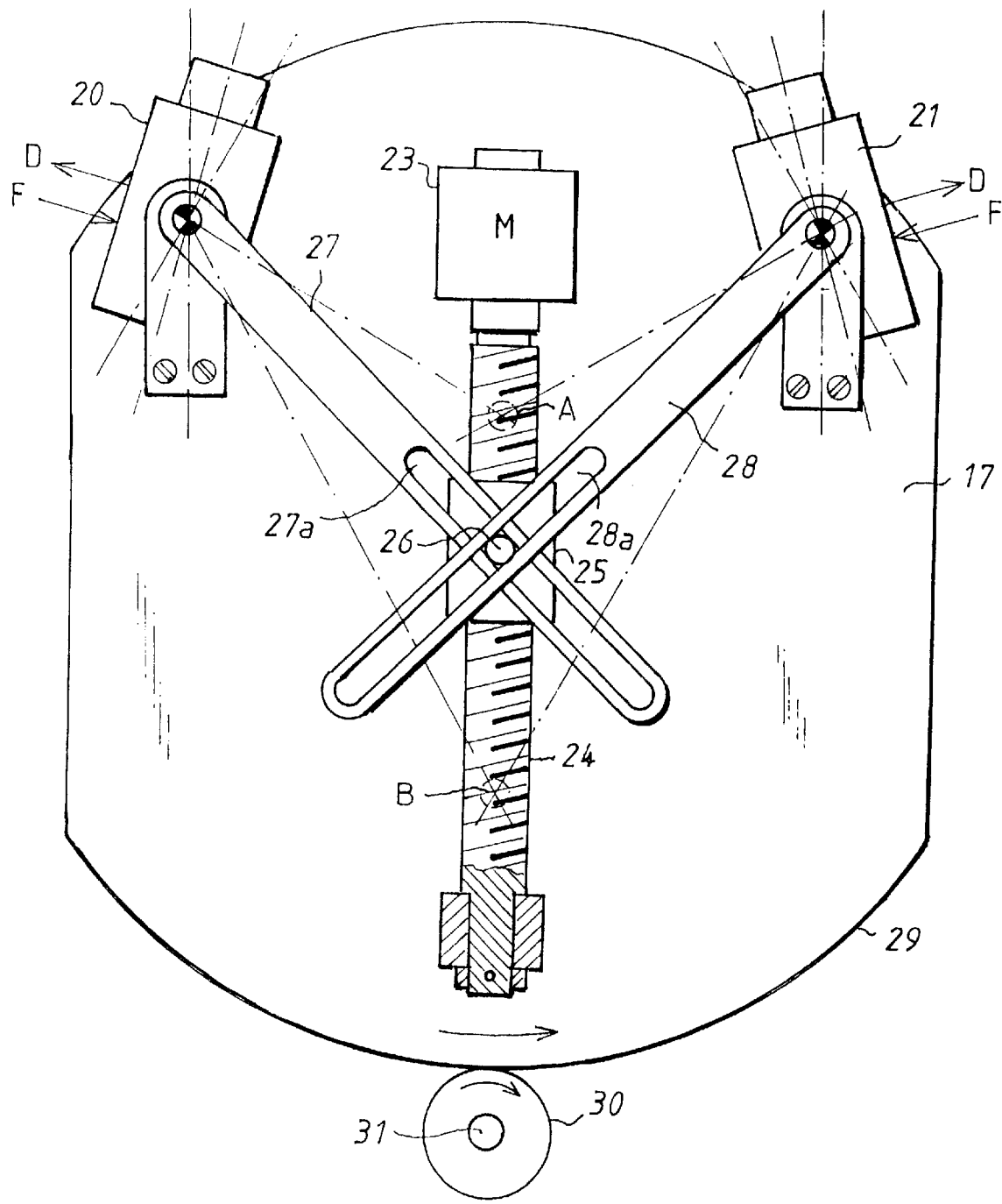

In the alternative embodiment in FIG. 2, the two cameras (20, 21) are accommodated on a plate 17 and are rotatable about an axis perpendicular to the optical axis of the cameras. The drive for the change of the convergence angle of both cameras (20, 21) is mounted on the plate 17. This drive comprises a threaded spindle 24, which is driven by an electric motor 23 and the spindle is rotatably journalled on the plate 17. A spindle nut 25 having a pin 26 meshes with the threaded spindle 24. Respective drive rods (27, 28) are fixedly connected to cameras (20, 21). The drive rods (27, 28) each have a longitudinal slot (27a, 28a) in which the pin 26 of the spindle nut 25 engages. With a rotation of the threaded spindle 24, the spindle nut 25 moves along the threaded spindle 24 in this arrangement with the result that the drive rods (27, 28) rotate the orientation of the cameras (20, 21) toward each other. If the pin 26 is in the position A, the optical axes of both cameras (20, 21) are almost parallelly aligned to each other so that stereoscopic image information of remote subject matter is recorded. If, in contrast, the pin 26 is in the position B, the optical axes of both cameras are aligned greatly convergent toward each other so that stereoscopic image data is recorded of subject matter in the proximity of the cameras (20, 21).

In this embodiment too, the focussing of the cameras is entrained simultaneously with the change of the convergence of both cameras (20, 21) so that both cameras are always focussed on the intersect point of the two optical axes. The input of the therefor necessary focussing control signal to the cameras is indicated by the arrow identified by F. The return line of the image signals, which are generated by the cameras, to the stereoscopic display system is indicated by the arrows identified by D.

A single motor 23 is provided for the mutually opposing movement of the two cameras in the embodiment of FIG. 1 as well as in the embodiment of FIG. 2. Compared to the embodiment of FIG. 1, the embodiment of FIG. 2, however, includes a further particularity. The carrier plate 17 for the two cameras (20, 21) is itself rotatable about an axis (not shown) which is aligned parallel to the rotational axes of the two cameras (20, 21). A gear element 29 is provided for the drive of the rotational movement of the entire recording system on the carrier plate 17. The gear element 29 meshes with a gear wheel 30 driven by a second motor 31. With the drive of the motor 31, the entire recording system is rotated about the rotational axis of the recording system so that different scenes can be stereoscopically recorded. The second motor 31 is, however, not driven in correspondence to the distance of the observer from the display system; rather, the second motor 31 is driven in correspondence to the horizontal position of the observer relative to the center of the display system. For a movement of the observer, for example to the right, the second motor 31 is so driven that a right rotation of the plate 17 takes place and a scene lying farther to the right is therefore recorded by the cameras and is displayed on the display system.

In principle, it is conceivable that also the data supplied by the head tracker 5 as to the elevation of the head of the observer can be utilized. In this case, a third motor would be provided which effects a rotation of the entire recording system in FIG. 2 about an axis parallel to the plane of the optical axes of both cameras. In this case, the scene recorded by the cameras moves upwardly for a lifting of the head and downwardly for a dropping of the head.

The rotation of the two cameras always takes place in the embodiments described in the figures in such a manner that the intersect point of the optical axes wanders along the center line between the two cameras in the plane of the optical axes. In principle, it is conceivable to undertake the rotation of the two cameras to each other so that the intersect point of the optical axes does not migrate along this center line. In a person, this would correspond to a lateral viewing when no head rotation takes place simultaneously. For such a movement, the effective stereo basis would, however, become smaller so that a reduced stereoscopic depth region (that is, a region wherein a stereoscopic viewing is given) results. It is therefore preferable that the entire recording system is rotated as in the embodiment of FIG. 2 for a lateral view in the object scene so that the stereo basis, which becomes effective, is always a maximum.

In a further embodiment of the invention, the distance signal, which is supplied by the head tracker, can be selectively coupled with the zoom which is conventionally available in video cameras in such a manner that, when the observer approaches, the effective focal width of the camera objectives is increased simultaneously with the change of the convergence of the optical axes of the cameras and the focussing to a closer point. The gear ratio factor should then be variable by the user. Depending upon the adjustment of the gear ratio factor, a differently intense magnification function is obtained for an approachement of the observer to the display system. In lieu of a constant gear ratio factor, a changing gear ratio factor can be provided which is a desired linear or nonlinear function of the distance of the viewer from the display system. A corresponding magnifying function for near viewing is, for example, advantageous with the use of the system for surgical applications, for example, when, within an otherwise large viewing field, a small blood vessel is investigated as to it being not traumatized. The activation of the coupling of the distance signal to the zoom adjustment can, for example, take place via a foot switch.

It is understood that the foregoing description is that of the preferred embodiments of the invention and that various changes and modifications may be made thereto without departing from the spirit and scope of the invention as defined in the appended claims.

What is claimed is:

1. A stereoscopic recording and display system comprising:

a stereoscopic display arrangement;

a support;

two cameras arranged on said support so as to be rotatable in mutually opposite directions and said two cameras having respective mutually converging optical axes conjointly defining an intercept point which moves along a predetermined path as said cameras rotate;

a focusing arrangement for focusing said cameras on said intercept point;

a head tracking system for detecting the position of an observer forward of said stereoscopic display arrangement; and, a control for adjusting the convergence of said optical axes in dependence upon the distance of said observer from said stereoscopic display arrangement.

2. The stereoscopic recording and display system of claim 1, wherein said control is adapted to provide an increase of said convergence when said observer approaches said stereoscopic display arrangement and to provide a decrease of said convergence when said observer moves away from said stereoscopic display arrangement.

3. The stereoscopic recording and display system of claim 2, said stereoscopic display arrangement including a display and a screen mounted forward of said display so as to face toward said observer.

4. The stereoscopic recording and display system of claim 3, said screen being movably mounted forward of said display; and, a device for displacing said screen relative to said display in correspondence to said position of said observer vis-a-vis said stereoscopic display arrangement.

5. The stereoscopic recording and display system of claim 1, said optical axes conjointly defining a plane; and, said support being rotatably mounted so as to be rotatable about a rotational axis perpendicular to said plane.

6. The stereoscopic recording and display system of claim 1, wherein said optical axes conjointly define a plane; and, at least one of said cameras is rotatable about an axis perpendicular to said plane.

7. The stereoscopic recording and display system of claim 1, wherein said optical axes conjointly define a plane; and, said cameras are rotatable about respective rotational axes perpendicular to said plane.

8. The stereoscopic recording and display system of claim 7, said rotational axes having a center line therebetween; and, said cameras being rotated so as to cause said predetermined path to be coincident with said center line.

9. The stereoscopic recording and display system of claim 1, wherein said control includes a single electric drive to impart rotation to said cameras.

* * * * *